Figure 5:
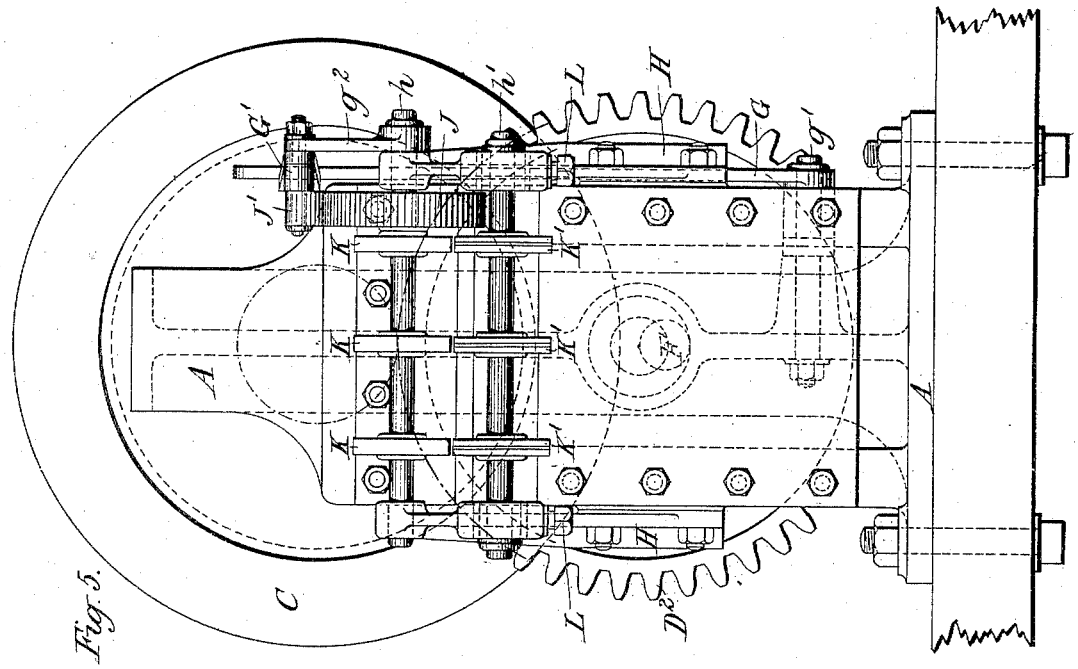

(No Model.)  
S. C. DAVIDSON.  
MACHINE FOR THE MANUFACTURE OF STAPLES.  
No. 503,264. Patented Aug. 15, 1893.
6 Sheets—Sheet 1.
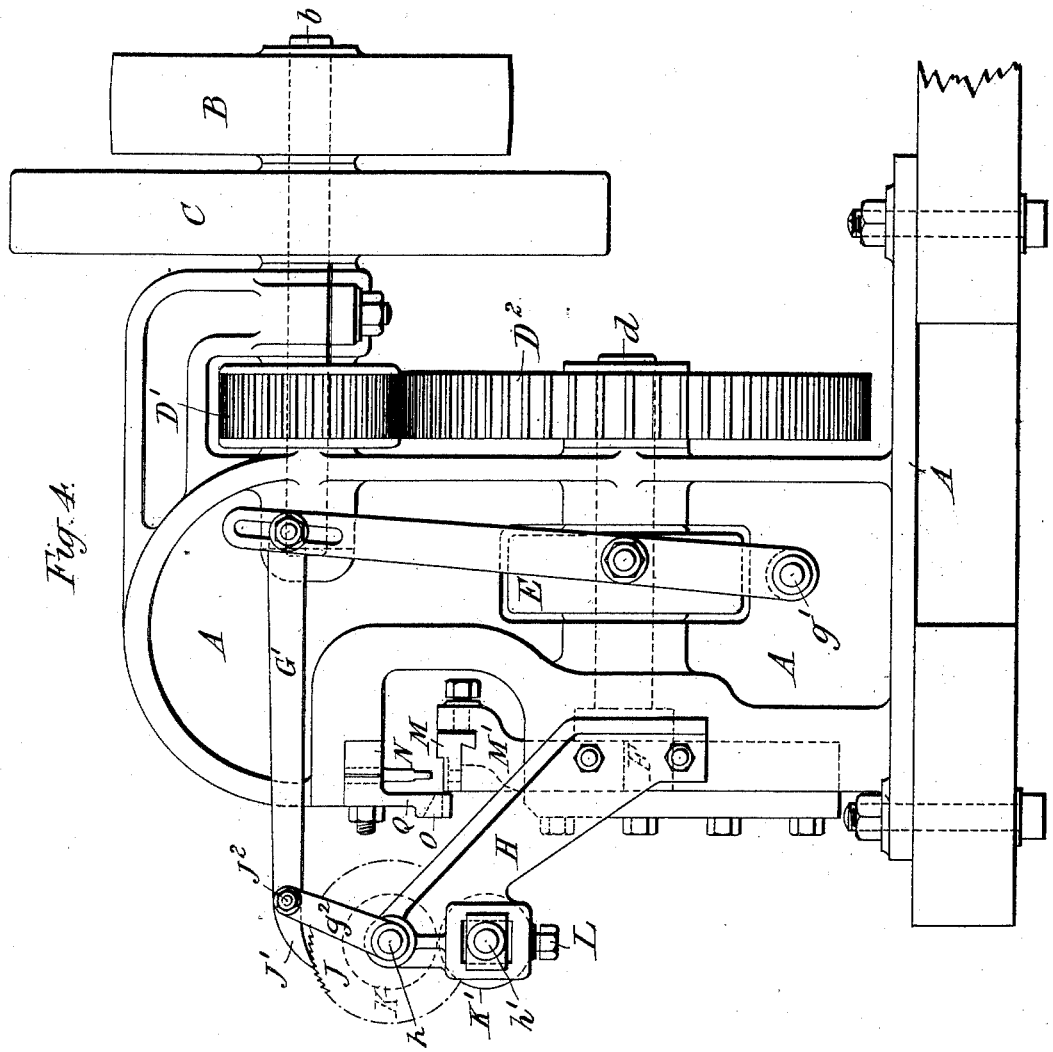
WITNESSES:  
Fred White  
L. K. Fraser.
INVENTOR:  
Samuel Cleland Davidson,  
By his Attorneys.  
Arthur C. Fraser & Co.

(No Model.) 6 Sheets—Sheet 2.

S. C. DAVIDSON.
MACHINE FOR THE MANUFACTURE OF STAPLES.

No. 503,264. Patented Aug. 15, 1893.

WITNESSES:
Fred White
L. K. Fraser.

INVENTOR:
Samuel Cleland Davidson,
By his Attorneys
Arthur C. Fraser

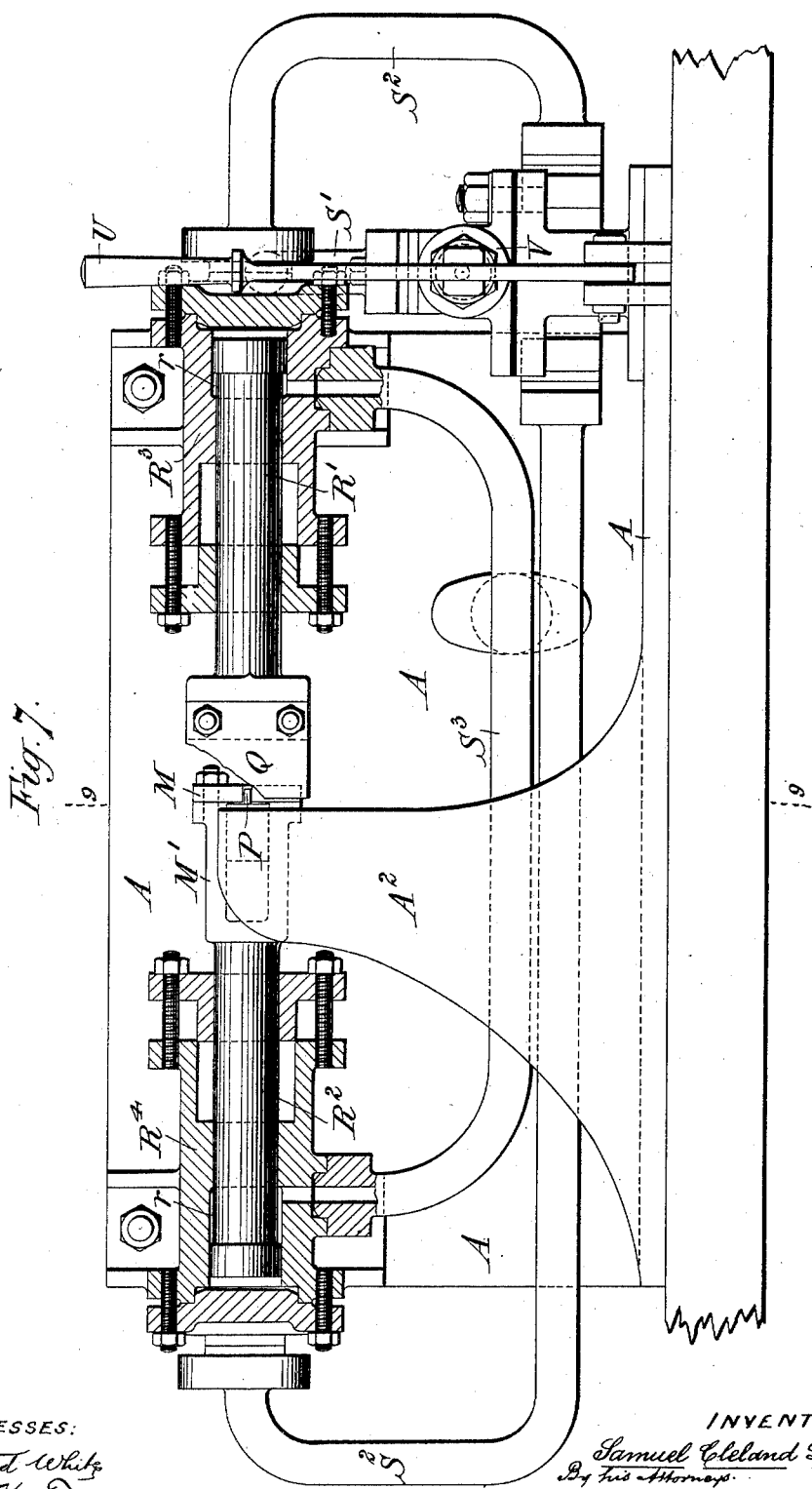

(No Model.) 6 Sheets—Sheet 4.
S. C. DAVIDSON.
MACHINE FOR THE MANUFACTURE OF STAPLES.

No. 503,264. Patented Aug. 15, 1893.

WITNESSES:
Fred White
C. K. Fraser.

INVENTOR:
Samuel Cleland Davidson,
By his Attorneys.
Arthur C. Fraser & Co.

(No Model.) 6 Sheets—Sheet 5.
S. C. DAVIDSON.
MACHINE FOR THE MANUFACTURE OF STAPLES.

No. 503,264. Patented Aug. 15, 1893.

WITNESSES:
Fred White
C. K. Fraser.

INVENTOR:
Samuel Cleland Davidson,
By his Attorneys,
Arthur E. Fraser & Co.

(No Model.) S. C. DAVIDSON. 6 Sheets—Sheet 6.
MACHINE FOR THE MANUFACTURE OF STAPLES.
No. 503,264. Patented Aug. 15, 1893.

WITNESSES:
Fred White
Thos. F. Wallace

INVENTOR:
Samuel Cleland Davidson,
By his Attorneys

UNITED STATES PATENT OFFICE.

SAMUEL C. DAVIDSON, OF BELFAST, IRELAND.

MACHINE FOR THE MANUFACTURE OF STAPLES.

SPECIFICATION forming part of Letters Patent No. 503,264, dated August 15, 1893.

Application filed July 19, 1892. Serial No. 440,447. (No model.)

*To all whom it may concern:*

Be it known that I, SAMUEL CLELAND DAVIDSON, of Belfast, Ireland, have invented certain new and useful Improvements in the Manufacture of Bifurcated Rivets or Two-Pronged U-Shaped Fasteners for Leather or other Substances and in Apparatus Therefor, of which the following is a specification.

My invention relates to the manufacture of bifurcated rivets or two-pronged U-shaped fasteners for leather or other substances, in which the interior faces of the prongs taper outward toward the ends, and the object of my invention is to cheaply and expeditiously manufacture rivets or fasteners of this class of such form or shape that the interior faces of their prongs so merge into the exterior faces of same that at their point of intersection they form cutting edges on the points of the prongs, which edges when driven into leather or other such substance, make cuts in same which are in corresponding line with the exterior edges of a cross-section of the prongs, and the outward tapering of the interior faces of the prongs toward the ends is such that when hammered or otherwise driven through substances such as leather, and the points emerge on the under or opposite side and are driven or forced against a metal or other hard smooth surface, the thin edges of the points of the prongs turn outward and upward so as to form a very strong and binding clinch on that side, without the leather or material between the prongs being severed or weakened thereby.

According to my invention wire preferably of half round or rectangular cross section and cut to suitable lengths is forced through a die corresponding in shape with an exact cross section of the exterior faces of the prongs of the rivet which is to be made by means of a punch having the exact form of the space that is to be left between the interior faces of said prongs. As this punch is gradually widened out toward the butt so as thereat to be of the same size as the die passing over it the die in passing along the punch to the thick part of the butt, gradually draws the points or ends of the wire up to a sharp edge at the end of each prong, at the point where the butt end of the punch exactly fits the die, and it is obvious that any superfluous metal at the ends of the wire will there be taken off by the edge of the die acting against the close fitting surface of the punch. The die is so constructed that when passed sufficiently far along the butt of the punch the rivet points are projected clear through the back of the die, and when so projected the slight back spring that still exists in the bent over prongs causes them to open slightly, so that the back of the die on returning off the punch catches the points of the prongs and pushes the rivet in front of it so that it falls off the punch and out of the machine; and the die, on returning to its original position is again ready to receive and similarly deal with another length of wire. Preferably the wire is fed in between the punch and the front of the die off a continuous length of wire by rollers which grip it between them, and which by regular intermittent movements bring the proper length of wire between the die and punch, and the die is so constructed that one side of it acts as a cutter against the edge of an orifice in a cutter plate connected with the punch, and through which the wire is fed in between the die and punch so that as the die moves forward it cuts off the proper length of wire for making the rivet just as the punch by its resistance against the die begins to bend the wire at the center of the cut length and to force it into and through the die. When it is desired to impress any form or device on the head of the rivet preferably as the first operation, a short forward motion is given to the punch to press the center of the length of wire against a stationary anvil with the required device in it whereby the device is impressed upon the wire and then the die is moved forward to bend the ends of the wire over the punch to form the prongs of the rivet as hereinbefore described. The movements of the die or punch may be given either by hydraulic pressure or by any suitable arrangement of cams or cranks.

The invention also comprises the apparatus arranged and working as above explained for manufacturing my improved bifurcated rivets or U-shaped fasteners.

The accompanying drawings represent several forms or designs of bifurcated rivets or U-shaped fasteners made in the manner hereinbefore described and also two constructions of apparatus of my invention for carrying out the said mode or process of manufacture.

Figure 9:
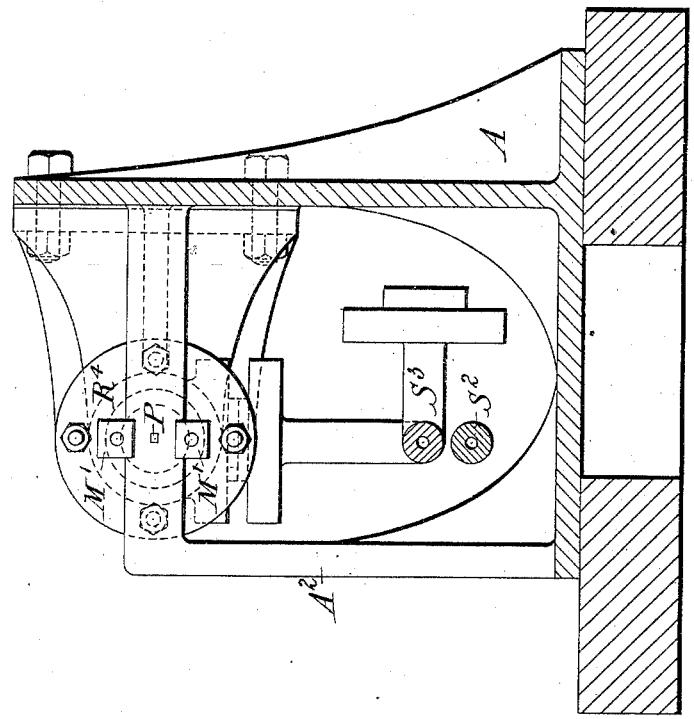
Figure 8:
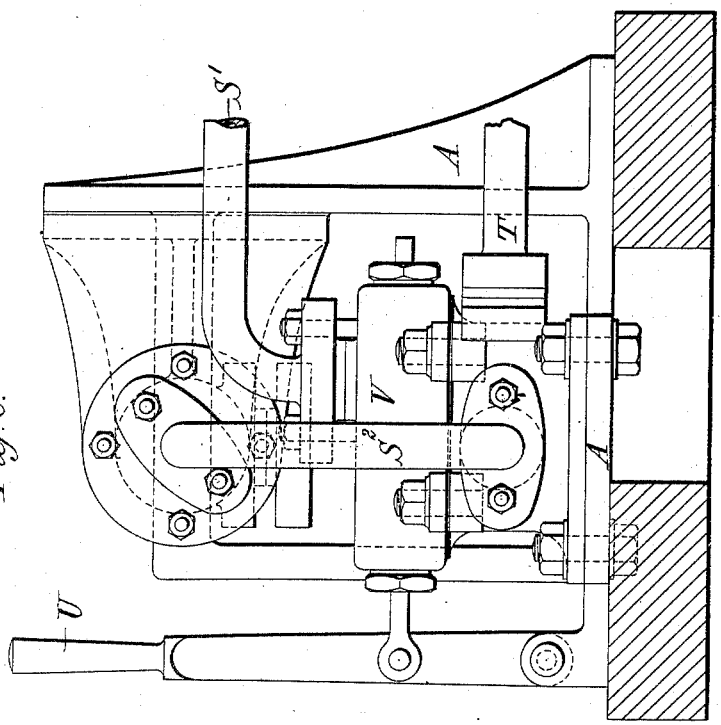
Figure 10:
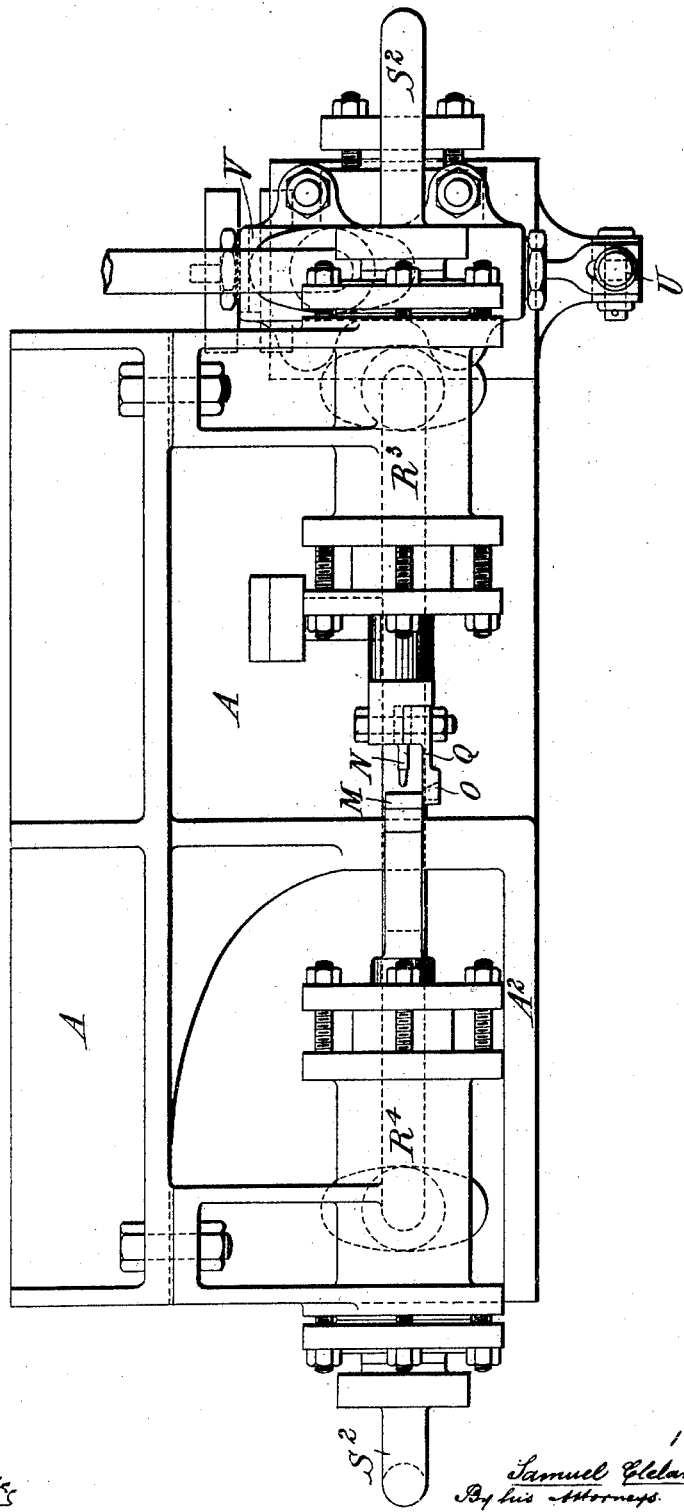
Figure 11:
Figure 12:
Figure 13:
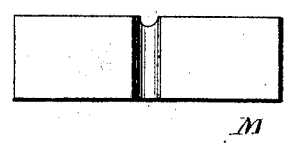
Figure 14:
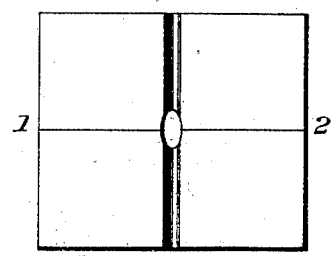
Figure 15:
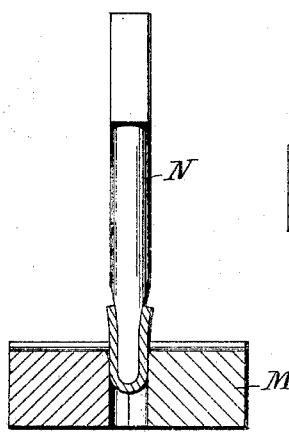
Figure 17:
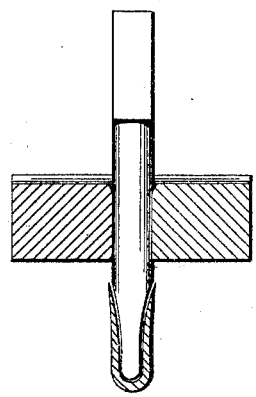
Figure 16:
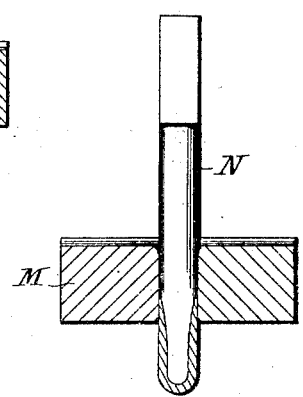

In the drawings,—Figure 1 is a view of a bifurcated rivet or U-shaped fastener in which the interior faces of the bifurcation gradually taper in a straight line from the top of the bifurcation out to the point of each prong. Fig. 2 is a view of a rivet or fastener in which a portion of the top end of the prongs of the rivet is of uniform section or thickness and the tapering of said prongs is carried from said portion of uniform section in a straight line to the points. Fig. 3 is a view of a rivet or fastener the same as that shown in Fig. 2 except that the tapering of the prongs to a point is by a curved instead of a straight line. Fig. 4 is a side elevation of a simple form of apparatus provided with my improved punch and die and actuated mechanically for making the bifurcated rivets or fastenings without impressing any device on their heads. Fig. 5 is a front elevation and Fig. 6 a plan of the apparatus shown in Fig. 4. Fig. 7 is a side elevation of the preferred form of apparatus embodying all the features of my present invention actuated by hydraulic pressure for making the bifurcated rivets or fastenings and also impressing a special device on the head of same, the hydraulic cylinders being shown in longitudinal section and part of the cutter plate being shown broken away to allow the anvil to be seen. Fig. 8 is an end elevation of the apparatus shown in Fig. 7. Fig. 9 is a section of same on line 9—9 looking in the direction of the arrow and Fig. 10 is a plan of the apparatus. Figs. 11 and 12 are edge and side views of the punch. Figs. 13 and 14 are respectively an elevation of one half of the die and a plan of the die, the latter being preferably divided into two parts on the line 1—2 in Fig. 14, so that the cavity of the die may be readily and more easily machined to fit the punch. Figs. 15, 16 and 17 are vertical transverse sections showing the die and punch in operation, Fig. 15 showing the cut length of wire being forced into the die, Fig. 16 showing the finished rivet being forced through the die just previous to its being projected therefrom, and Fig. 17 showing the parts after the rivet has been forced entirely through the die, and showing its prongs sprung somewhat apart so that upon the return movement they will catch against the face of the die to strip the rivet off from the punch.

The construction of the punch and die will be readily understood from Figs. 11 to 17, where N designates the punch and M the die, the latter being made with a recess through it in which the punch works, and with a groove along its face into which the wire from which the rivet is to be made is fed, and in which it lies until the punch engages it.

Figure 6:
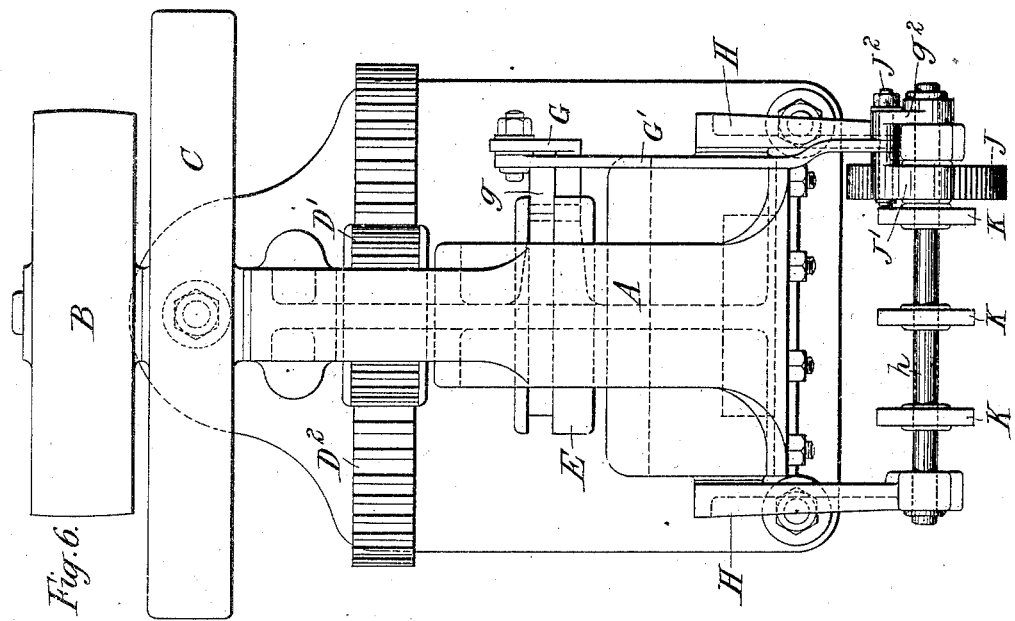

Referring now to the apparatus shown in Figs. 4, 5 and 6, A A represent the cast iron frame and body or bed plate. $b$ is the driving shaft, B the driving pulley and C the fly wheel. D' is a pinion on the driving shaft gearing with the spur wheel $D^2$ on a shaft $d$. E is a cam on the shaft $d$ for giving to and fro movement to the lever G, a projection $g$ on which works in the cam groove. The lower end of the lever G is pivoted at $g'$ to the frame A and its upper end which is slotted is connected with one end of the lever G' whose other end carries the pawl J' so that this pawl participates in the to and fro motion imparted to the lever G' from the lever G. The movement of the pawl and of the lever G' is controlled by the link $g^2$, one end of which is pivoted to the upper roller shaft $h$ and its other end to the pawl spindle $J^2$. The pawl J' imparts intermittent motion to the ratchet wheel J which is keyed on the shaft $h$ of the upper feed rollers K, and these rollers consequently move with the ratchet wheel J. $h'$ is a shaft carrying the lower feed rollers K' each of which has a circumferential groove to receive and guide the continuous length of wire from which the rivets are to be formed. L L are adjusting screws and bearings for regulating the degree that the feed rollers K K' grip the wire. The feed rollers are supported by the brackets H H. M is one of the dies the number of which will be equal to that of the pairs of feed rollers K K' three of which are shown by way of example in the drawings. The dies are held in a carrier slide M' to which an up and down motion is imparted by means of the crank F on the shaft $d$. N represents one of the punches which in this case are fixed; these punches have the exact form of the space that is to be left between the interior faces of the prongs of the rivets while the hole or aperture in the corresponding dies M corresponds in shape exactly with a cross section of the exterior faces of the prongs. Q is a cutter plate having orifices O one for each wire through which said wire passes from the feed rollers to the die and punch. It will be readily understood that at each revolution of the driving shaft the feed rollers by their intermittent movement imparted by the pawl J' feed through each hole O a sufficient length of wire for one rivet, that the dies M then rise and in so doing they each first cut off the length of wire against the edge of the corresponding orifice O, this side of the die being formed to act as a cutter, and then by passing over the punch bend the wire at the center of the cut length, the wire shaped into the form of a rivet being forced through the die. The dies then descend ready for the next action while the pawl J' moves back ready to give the next intermittent motion to the feed rollers K K'.

Referring now to the preferred form of my invention as embodied in the modification shown in Figs. 7 to 10, the punch N (the apparatus is shown as having only one, but there may be more) is carried by a ram R' working in a hydraulic cylinder R³ and the die M by a ram R² working in a hydraulic cylinder R⁴. S' is the hydraulic supply pipe from the accumulator and leading to a valve V. S² S² are two pipes leading from the valve V to the two cylinders R³ R⁴ respectively. S³ is a hydraulic supply pipe always communicating between the accumulator and the cylinders R³ R⁴ to effect the back stroke of the rams. T is the exhaust pipe. U is a lever for working the valve V; P is the stationary anvil by means of which the required device is impressed upon the head of the rivet; this anvil is carried by the piece A²; the die carrier M' is forked so as to clear this piece. When the lever U is worked in the one direction the valve V first opens the way for the water under pressure to the cylinder R³. The ram R' therefore makes its forward stroke and presses the punch N upon the wire against the stationary anvil P so that the device on the anvil becomes impressed upon that part of the wire which will become the head of the rivet. The length of wire is at same time severed by the cutter plate passing the cutting edge of the die M; then the valve V by its further movement opens the way for the water under pressure to the cylinder R⁴. The ram R² therefore makes its forward stroke and forces forward the die M which in this movement shapes the wire over the punch into a rivet. The lever U is now moved in the reverse direction and in this movement it opens the exhaust of both cylinders R³ R⁴ simultaneously and the water under pressure in the pipe S³ by then acting in the annular spaces r r in these cylinders carries both rams back and the finished rivet drops off the end of the punch as it is withdrawn from the anvil. The wire may be fed to the punch and die in the apparatus shown in Figs. 7 to 10 either by hand or by a suitable arrangement of feed rollers such as those described with reference to Figs. 4, 5 and 6.

The apparatus shown in Figs. 4, 5 and 6 can be adapted to impress a device upon the head of the rivet by means of a forward movement imparted to the punch N as described with reference to Figs. 7 to 10 before the die M begins its movement. The necessary movement of the punch can be effected in many obvious ways such for example as fixing it in a slide to which a reciprocating movement is given by a crank on the shaft $d$ that is to say in the same way as the reciprocating movement is given to the die M.

What I claim, and desire to secure by Letters Patent, is—

1. In an apparatus for manufacturing pointed bifurcated rivets or two pronged U shaped fasteners, the combination substantially as set forth of a punch and die, mounted to reciprocate the one relatively to the other, the punch having the same outline as the interior surfaces of the prongs of the rivet, and the die having drawing working faces embracing the punch, sliding over the working faces thereof as the punch enters the die, and having the shape of the exterior outline of said prongs, and the punch exactly filling the die at the points of the prongs, and entering the die until the points of the prongs are within the working faces thereof whereby when a length of wire is forced into the die by the punch, such wire is bent and drawn into the shape of the space between the working faces of the punch and die, and is thereby shaped into a rivet, and the excess of metal in such wire is shaved off by said die, thereby pointing the rivet, all substantially as set forth.

2. In an apparatus for manufacturing pointed bifurcated rivets or two pronged U shaped fasteners, the combination substantially as set forth of a punch and die, mounted to reciprocate the one relatively to the other, the punch having the same outline as the interior surfaces of the prongs of the rivet, and the die open at both ends and having the shape of the exterior outline of said prongs, and the punch exactly filling the die at the point of the prongs, whereby when a length of wire is forced into the die by the punch, such wire is bent and drawn into the shape of the space between the working faces of the punch and die, and is thereby shaped into a rivet, and the excess of metal in such wire is shaved off by said die, one of the outer sides of said die having a cutting edge, and a cutter plate acting against said cutting edge and having an orifice for the passage of the wire to be formed into rivets, whereby in the forward stroke a length of wire is cut off by said plate and then forced into the die by the punch, bent and drawn into the shape of a rivet, and forced out of the opposite end of the die, where, by reason of its springing slightly open the ends catch against the die on the return movement and the rivet is thereby drawn off the punch, all substantially as set forth.

3. In an apparatus for manufacturing bifurcated rivets or two pronged U-shaped fasteners, the combination with a reciprocating punch and a reciprocating die adapted to bend and shape a length of wire into a rivet, of an anvil bearing a device the counterpart of which is required in the rivet head, means whereby the punch is given a forward motion to press the wire against the anvil and means whereby the die is then given a forward motion to bend and shape the wire into a rivet substantially as set forth.

4. In an apparatus for manufacturing bifurcated rivets or two pronged U-shaped fasteners, the combination substantially as set forth of a reciprocating punch, an anvil adapted to act in conjunction with said punch to impress a device upon the center of a piece of wire which is to be formed into a rivet, a reciprocating die adapted to act in conjunction with said punch to bend and shape the said wire into a rivet, one of the outer sides of said die having a cutting edge, and a cutter plate adapted to act in conjunction with said cutting edge all substantially as hereinbefore described and shown.

In witness whereof I have hereunto signed my name in the presence of two subscribing witnesses.

SAMUEL C. DAVIDSON.

Witnesses:
 WILLIAM FREW,
 HENRY M. HARRIS.